US007639635B2

(12) United States Patent
Anderson et al.

(10) Patent No.: US 7,639,635 B2
(45) Date of Patent: Dec. 29, 2009

(54) CELLULAR COMMUNICATION SYSTEM AND METHOD FOR COEXISTENCE OF DISSIMILAR SYSTEMS

(75) Inventors: Nicholas William Anderson, Bristol (GB); Martin Warwick Beale, Bristol (GB)

(73) Assignee: IPWireless, Inc., San Francisco, CA (US)

( * ) Notice: Subject to any disclaimer, the term of this patent is extended or adjusted under 35 U.S.C. 154(b) by 714 days.

(21) Appl. No.: 11/303,781

(22) Filed: Dec. 15, 2005

(65) Prior Publication Data

US 2007/0081489 A1 Apr. 12, 2007

(51) Int. Cl.
*H04J 3/00* (2006.01)
(52) U.S. Cl. ...................... 370/280; 370/294
(58) Field of Classification Search .............. 370/347, 370/280, 281, 321, 350, 329, 330, 337, 276, 370/324, 294; 375/354, 355, 356
See application file for complete search history.

(56) References Cited

U.S. PATENT DOCUMENTS

| 5,732,076 | A  | * | 3/1998 | Ketseoglou et al. ......... 370/347 |
| 6,707,798 | B1 |   | 3/2004 | Klein et al. |
| 7,224,977 | B2 | * | 5/2007 | Cavalli et al. ............ 455/452.1 |
| 7,428,228 | B2 | * | 9/2008 | Jeong et al. ................ 370/335 |

FOREIGN PATENT DOCUMENTS

| EP | 1227602 A1 | 7/2002 |
| GB | 2394390 A | 4/2004 |
| WO | WO-2007042443 A1 | 4/2007 |

OTHER PUBLICATIONS

Holma, H. et al. eds. (2001). *WCDMA for UMTS: Radio Access for Third Generation Mobile Communications*. John Wiley & Sons Ltd.: West Sussex, England, 10 pages (Table of Contents).
International Search Report mailed Feb. 14, 2007, for PCT Application No. PCT/EP2006/067055 filed Oct. 4, 2006, 2 pages.

* cited by examiner

*Primary Examiner*—Chi H Pham
*Assistant Examiner*—Alexander Boakye
(74) *Attorney, Agent, or Firm*—Fitch Even Tabin & Flannery (57) ABSTRACT

A cellular communication system comprises first and second serving communication units supporting respective first and second time division duplex (TDD) modes of operation on respective first and substantially frequency-adjacent second frequency channels comprising a plurality of uplink transmission resources divided into uplink timeslots and a plurality of downlink transmission resources divided into downlink timeslots. The first and second modes of TDD operation are dissimilar and communications cover substantially the same or overlapping geographic area. The first serving communication unit transmits a plurality of idle periods in the first mode of operation arranged to encompass a time period used by the second serving communication unit for switching communication between downlink and uplink transmissions of the second mode of operation.

32 Claims, 7 Drawing Sheets

LCR-TDD

E-UTRA with LCR-TDD frame structure

CELLULAR COMMUNICATION SYSTEM AND METHOD FOR COEXISTENCE OF DISSIMILAR SYSTEMS

CROSS-REFERENCE TO RELATED APPLICATIONS

This application claims benefit of United Kingdom application GB 0520553.9 filed Oct. 10, 2005, the contents of which are incorporated herein by reference.

FIELD OF THE INVENTION

The invention relates to coexistence of cellular communication systems and in particular, but not exclusively, to coexistence of time-division duplex technologies in a $3^{rd}$ Generation Partnership Project (3GPP) cellular communication system.

BACKGROUND OF THE INVENTION

Currently, 3rd generation cellular communication systems are being rolled out to further enhance the communication services provided to mobile users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. In time division multiple access (TDMA) systems user separation is achieved by assigning different time slots to different users.

In addition to TDMA, TDD provides for the same carrier frequency to be used for both uplink and downlink transmissions. The carrier is subdivided in the time domain into a series of timeslots. The single carrier is assigned to uplink during some timeslots and to downlink during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In order to provide enhanced communication services, the 3rd generation cellular communication systems are designed to support a variety of different services, including packet based data communication. Likewise, existing $2^{nd}$ generation cellular communication systems, such as the Global System for Mobile communications (GSM) have been enhanced to support an increasing number of different services. One such enhancement is the General Packet Radio Service (GPRS), which is a system developed for enabling packet data based communication in a GSM communication system. Packet data communication is particularly suited for data services which have a dynamically varying communication requirement such as, for example, Internet access services.

Figure 1:
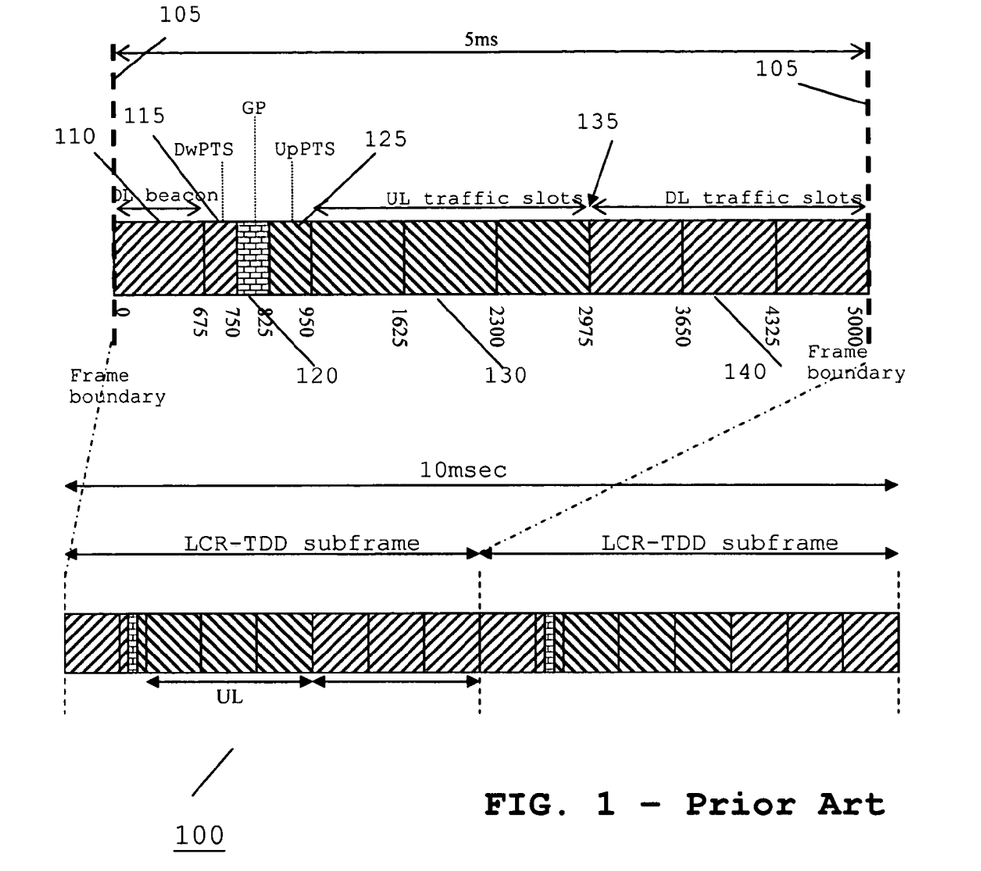
FIG. 1 illustrates the frame structure of the time division duplex low chip rate (LCR-TDD) technology in a 3GPP cellular communication system.

Low chip rate TDD (LCR-TDD) is a TDD system that is part of the third generation set of technologies. In contrast to other third generation technologies, LCR-TDD employs a chip rate of 1.28 Mcps. The LCR-TDD technology also has a unique frame structure 100, as illustrated in FIG. 1.

Here, a 10 msec frame 100 consists of two 5 msec sub-frames. Contained within the 5 msec sub-frame boundaries 105, a first time timeslot 110 is typically dedicated for a downlink beacon transmission of duration 75 μsec. A downlink pilot time slot (DownPTS) field 115 is then sent for downlink synchronisation of duration 75 μsec. An uplink pilot time slot (UpPTS) 125 of duration 125 μsec is similarly used for uplink synchronisation.

A guard period (GP) 120 of duration 75 μsec is located between the uplink and downlink pilot time slots 115, 125. Following the uplink pilot time slot (UpPTS) 125, a number of Uplink traffic slots 130 and downlink traffic slots 140 are transmitted, each of duration 675 μsec. Thus, within an LCR-TDD timeslot, multiple channels (or multiple users) may be multiplexed together using code division multiple access (CDMA). An UL/DL switching point 135 defines the changeover in operation of the LCR-TDD sub-frame from UL transmissions to DL transmissions.

It is noteworthy that there is some variability in the LCR-TDD sub-frame in that the position in time of the UL/DL switching point 135 can be moved within the radio sub-frame. FIG. 1 shows the case where the number of uplink traffic slots 130 is equal to the number of downlink traffic slots 140. This, however, may be varied between the case in which there is only one downlink traffic slot per sub-frame and the case in which there is only one uplink traffic slot per sub-frame (at least one slot in each link direction must be present to facilitate bi-directional communication).

Recently, significant effort has been invested in designing a new air-interface, termed E-UTRA, for use within 3GPP systems. The new E-UTRA air-interface can be operated in unpaired spectrum using a TDD mode or in paired spectrum using a FDD mode; it is based on orthogonal frequency division multiple access (OFDMA) in the downlink channel and either OFDMA or frequency division multiple access (FDMA) in the uplink channel. The E-UTRA air interface is time-slotted and multiple channels (or multiple users) can be multiplexed together through frequency domain multiple access techniques (OFDMA and FDMA). The timeslot duration of E-UTRA is 0.5 msec.

It is envisaged that E-UTRA can be deployed with a low latency structure where it is possible to switch between downlink timeslots and uplink timeslots on a per timeslot basis, i.e., allowing the link to be rapidly switched. This enables low latency transmission and re-transmission by virtue of the ability, thus offered, for the receiving end to quickly acknowledge receipt of a data packet by transmitting an acknowledgement in the reverse link direction. An alternative higher-latency structure is also possible where switching between downlink timeslots and uplink timeslots would occur on, say, a five timeslot basis.

Within the 3GPP standard's committees, where the communication system's specifications are being defined, there has been a significant amount of discussion on the ability of different technologies to co-exist within the same or adjacent frequency bands.

It is known that a subscriber unit, referred to as user equipment (UE) within 3GPP, or a wireless communication serving unit, referred to as Node-B within 3GPP, that transmits at one carrier frequency inevitably ends up also transmitting some energy at frequencies that are outside the nominal bandwidth of the carrier frequency. Hence, energy is emitted not only in the intended (frequency) band, but also in adjacent bands, as illustrated in FIG. 2.

Figure 2:
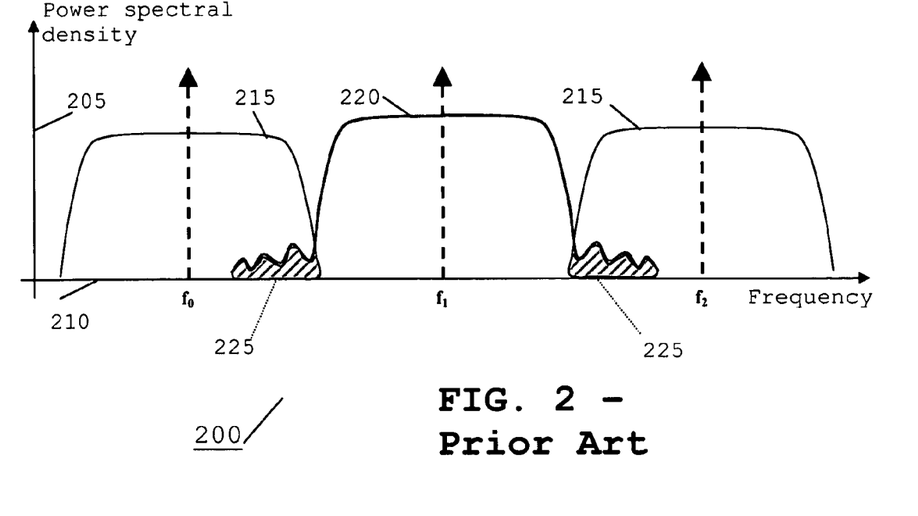
FIG. 2 illustrates graphically the leakage of energy into adjacent frequency bands in a 3GPP cellular communication system.

Referring now to FIG. 2, a spectral plot 200 of receiver characteristics 215 and transmitter characteristics 220 is shown, with frequency 210 plotted against power spectral density 205. Thus, FIG. 2 shows transmissions 220 at a carrier frequency $f_1$, which comprise leakage energy 225 that interfere with reception in adjacent bands $f_0$ and $f_2$.

In a cellular deployment, multiple frequencies may be used by the same operator. In addition, a single Node B may be configured to control multiple frequencies. Alternatively, the Node-B may be configured to control a single frequency. The Node-Bs that serve these different frequencies may be either co-located or may be located in different cell sites. Users may be located anywhere in the geographic area of the Node-Bs, i.e., users may roam or move around a particular geographical area supported by a single Node-B or by multiple Node-Bs.

Figure 3:
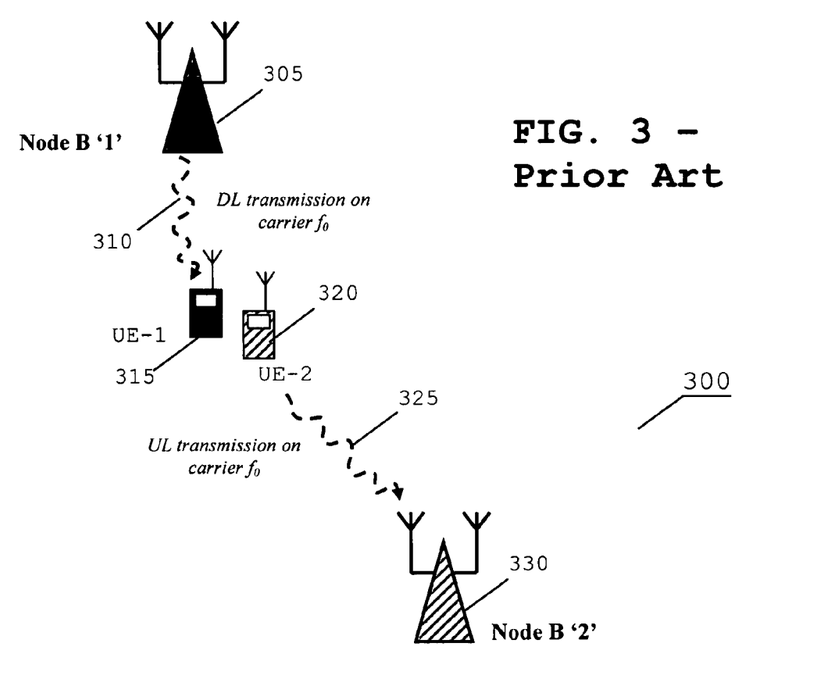
FIG. 3 illustrates user equipment to user equipment interference in a TDD system.

This interference problem is explained further in FIG. 3, which illustrates a situation 300 where there is UE to UE interference in an unsynchronised TDD system. FIG. 3 illustrates a first Node-B-1 305 that transmits to a first UE (labelled "UE-1") 315 on a downlink carrier frequency $f_0$ (for example, the carrier frequency labelled $f_0$ in FIG. 2) 310. FIG. 3 also illustrates that, at the same instant in time, a second UE (labelled "UE-2") 320 transmits to a Node-B (labelled "Node-B-2") 330 on an uplink carrier frequency $f_1$, (for example, the carrier frequency labelled $f_1$ in FIG. 2) 325.

In FIG. 3, it is assumed that UE-1 315 and UE-2 320 are located a significant distance from the Node-Bs 305, 330, that they are communicating with. Hence, UE-1 315 will receive the transmission from Node-B '1' at a low level, where the first Node-B 305 may only be able to maintain a link to UE-1 315 by using a low coding rate, allowing the first UE-1 315 to receive at a low power level. UE-2 320 will transmit to Node-B '2' 330 using a high power, in an attempt to maintain a communication link. If UE-1 315 and UE-2 320 are closely located, then the path loss between UEs 315, 320, will be minimal. In this case, spurious emissions from the uplink transmission of UE-2 320 will leak into the adjacent frequency $f_0$ and will significantly impair reception of the transmission to UE-1 315.

A variety of solutions have been identified, in the field of wireless cellular communications, to address the problem of operating a new TDD technology with an evolved TDD air interface within the same geographic area.

A first solution, which has been proposed within the 3GPP standards forum, is to use a frequency guard band between a carrier used for E-UTRA and a carrier used for UTRA TDD. Use of a guard band works on the principle that although leakage of energy into an adjacent carrier might be significant, leakage of energy into carriers that are further separated in frequency is less significant. Thus, the guard band approach sacrifices those carries in which there may be significant leaked energy, i.e., these carriers are not used. This approach is wasteful of spectral resource, but is a simple solution to the problem.

A second solution is to specify amplifier characteristics and filter characteristics (such as through adjacent channel leakage ratio and adjacent channel selectivity specifications) in UEs and Node-Bs, such that the energy that they leak into adjacent channels is insignificant. This approach is not wasteful of spectral resource, but does increase the cost of UE and Node-B equipment.

A third solution would be to design E-UTRA to have an identical frame structure to the UTRA TDD structure, such that they operate synchronously. This approach is illustrated in the timing diagram 400 of FIG. 4. The approach is not wasteful of spectral resource, but does limit the performance and flexibility of E-UTRA. For example, with such a solution, the frame structure of E-UTRA must contain the same uplink/downlink switching points as UTRA TDD. Maintaining the same switching points as UTRA TDD will lead to the latency experienced by E-UTRA transmissions being of the same order as those of UTRA TDD transmissions, albeit that latency can be reduced in 3.84 Mcps TDD (HCR-TDD) by shortening the time between uplink and downlink transmissions, i.e., by increasing the number of switching points for both systems (noting that use of multiple switching points is not currently possible for LCR-TDD).

Figure 4:
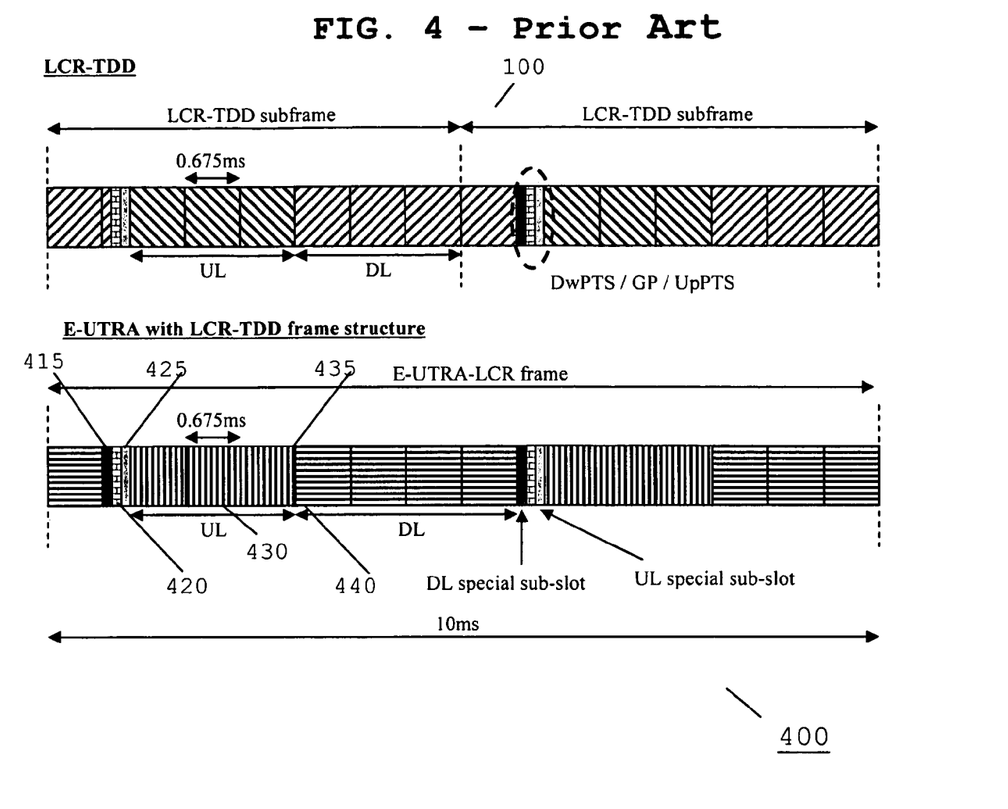
FIG. 4 illustrates a frame structure of an E-UTRA system arranged to have an identical frame structure to the UTRA TDD structure, such that they operate synchronously within a 3GPP cellular communication system.

FIG. 4 illustrates a typical LCR-TDD frame structure 100, as shown in FIG. 1. In this example, a 3:3 DL:UL timeslot split for traffic data is shown. Also shown is a downlink timeslot that is typically used for beacon type transmissions in the first timeslot of the sub-frame and the DwPTS/GP/UpPTS fields, as previously mentioned.

FIG. 4 also illustrates a modified version of E-UTRA operating in an identical frame structure to LCR-TDD. In this mode, the E-UTRA sub-frame (also referred to as timeslot within a 3GPP context) duration is extended from 0.5 msec to 0.675 msec. In this mode, special sub-slots 415, 425 are inserted in the frame in order to facilitate coexistence between the LCR-TDD frame and the E-UTRA frame. These special sub-slots may either be idle (no data transmitted) or the UL special sub-slot may be used to transmit some uplink data, signaling or pilot information and the DL special sub-slot may be used to transmit some downlink data, signaling or pilot information.

Note that the frame structure illustrated in FIG. 4 has the at least the following disadvantages. For example, the E-UTRA frame is constrained to have two DL to UL (and two UL to DL) switching points per frame. This significantly impacts the minimum latency that can be achieved with such a frame structure. Furthermore, the E-UTRA sub-frame duration of 0.675 msec., when used in this compatibility mode, is different to the sub-frame duration of 0.5 msec that is used in paired spectrum.

It is noteworthy that LCR-TDD only operates in unpaired spectrum. This different sub-frame duration may also impact the design of the signal within the sub-frame. When E-UTRA supports two different sub-frame durations (as per the prior art discussed here), the design of UEs and Node-Bs that can operate in both paired spectrum and unpaired spectrum becomes much more complicated. This complexity increase will typically lead to a cost increase for UE and Node B equipment.

Thus, current techniques are suboptimal. Hence, an improved mechanism to address the problem of operating a new TDD technology with an evolved TDD air interface within the same geographic area would be advantageous. In particular, a system allowing for the provision of an E-UTRA TDD system to co-exist with a LCR-TDD system would be advantageous.

SUMMARY OF THE INVENTION

Accordingly, some embodiments of the invention seeks to preferably mitigate, alleviate or eliminate one or more of the abovementioned disadvantages singly or in any combination.

According to a first aspect of some embodiments of the invention, there is provided, a cellular communication system. The cellular communication system comprises a first serving communication unit supporting a first time division duplex (TDD) mode of operation on a first frequency channel comprising a plurality of uplink first transmission resources divided into uplink timeslots and a plurality of downlink first transmission resources divided into downlink timeslots. A second serving communication unit supports a second time division duplex (TDD) mode of operation on a second frequency channel adjacent to the first frequency channel and supports a plurality of uplink second transmission resources divided into uplink timeslots and a plurality of downlink second transmission resources divided into downlink timeslots. The first and second modes of operation are dissimilar and communication over a substantial geographic area is provided by each of the two dissimilar TDD modes of operation. The first serving communication unit transmits a plurality of idle periods (during which no signal is transmitted) in the first mode of operation, which are arranged to encompass time periods used by the second serving communication unit for switching communication between downlink and uplink transmissions of the second mode of operation.

By introducing idle periods into transmissions according to the first mode of operation, and arranging these idle periods to encompass time periods used for switching in the second mode of operation, some embodiments of the invention may allow interference between the two dissimilar TDD systems, on adjacent frequency channels, to be reduced.

Some embodiments of the invention may allow improved use of the communication resource in the communication system. Some embodiments of the invention may allow improved performance as perceived by the end-users. Some embodiments of the invention may provide increased capacity, reduced delays and/or increased effective throughput, for example via an improved deployment of E-UTRA systems.

Some embodiments of the invention may allow for a communication system to use resources that are not currently being used for other purposes or for other users, through a more efficient manner in scheduling transmissions of two dissimilar interfering modes of operation. Some embodiments of the invention may be compatible with some existing communication systems, such as 3GPP TD-CDMA or TD-SCDMA cellular communication systems.

According to an optional feature of some embodiments of the invention, the idle period may be an idle timeslot of the first mode of operation.

This may allow for efficient resource usage by ensuring whole timeslots are transmitted without receiving adjacent frequency channel interference.

According to an optional feature of some embodiments of the invention, the idle period may comprise one or more of the following: a part of a timeslot, a lack of an OFDM symbol, a lack of an FDMA block, duration of an OFDM pilot, duration of an FDMA pilot or duration of a CDMA data payload.

This may allow for efficient resource usage as only necessary portions of the transmissions of the first mode of operation are idle; non-idle portions being used for data transmission. Furthermore, this aspect of the invention may utilise existing timeslot structures, for example, an E-UTRA DL timeslot consists of a set of OFDM symbols, one or more of which may be used as an idle period. In addition, an E-UTRA UL timeslot comprises of either: a set of OFDM symbols or a set of FDMA blocks, one or more of which may be used as an idle period. A TD-CDMA timeslot comprises two data payloads, a midamble and a guard period, one or more of which may also be used as an idle period.

According to an optional feature of some embodiments of the invention, the idle periods are introduced into the first and second modes of operation and are configured to encompass switching periods of the other dissimilar mode of operation.

This may allow for a reduction in adjacent frequency channel interference for both TDD-based systems.

According to an optional feature of some embodiments of the invention, only the adjacent channel frequency transmission between the two dissimilar modes of operation is configured to contain idle periods that encompass time periods used for switching. Some embodiments of the invention may therefore maximise the data throughput of transmissions not affected by the potential for adjacent channel interference.

According to an optional feature of some embodiments of the invention, the first serving communication unit and/or second serving communication unit may transmit at a frame offset to adjust a timing of the idle period to encompass the switching period of the other dissimilar mode of operation. This may allow a more efficient usage of one or both frame structures to maximise data throughput.

According to an optional feature of some embodiments of the invention, a scheduler may be configured to schedule complete timeslots as idle periods in the first and/or second modes of operation by scheduling neither uplink nor downlink transmissions in a particular timeslot. Alternatively, the scheduler may schedule specially constructed timeslots with sufficient idle period within them to encompass the switching point of the LCR-TDD system.

This may allow a scheduler to schedule a special timeslot across the switching time of an adjacent LCR-TDD transmission. For example, the scheduler might schedule a timeslot that is half-data and half-idle period. Thus, instead of discarding a whole timeslot at the switching point, it is possible to discard only a portion of the timeslot.

This may also allow a simple and more efficient mechanism to avoid interference effects between the two dissimilar TDD technologies.

According to an optional feature of some embodiments of the invention, the invention may provide particularly advantageous performance for $3^{rd}$ Generation Partnership Project (3GPP) cellular communications. Thus, some embodiments of the invention may support E-UTRA communication. Furthermore, some embodiments of the invention may be used to support GERAN/3G communication, such as LCR-TDD and/or HCR-TDD communications.

According to a second aspect of some embodiments of the invention, there is provided a wireless serving communication unit. The wireless serving communication unit comprises a transmitter operably coupled to a processor and a timing function, wherein the wireless serving communication unit supports a first time division duplex (TDD) mode of operation on a first frequency channel, substantially adjacent a second time division duplex (TDD) mode of operation on a second frequency channel, and comprises a plurality of uplink first transmission resources divided into uplink timeslots and a plurality of downlink first transmission resources divided into downlink timeslots. The first and second modes of operation are dissimilar, and communication over a substantial geographic area is provided by each of the two dissimilar TDD modes of operation. The processor arranges for transmissions of a plurality of idle periods in the first mode of operation arranged to encompass a time period used for switching communication between downlink and uplink transmissions of the second mode of operation.

According to a third aspect of some embodiments of the invention, there is provided a method of assigning wireless transmissions in a cellular communication system. The method comprises the steps of supporting a first time division duplex (TDD) mode of operation on a first frequency channel comprising a plurality of uplink first transmission resources divided into uplink timeslots and a plurality of downlink first transmission resources divided into downlink timeslots; and supporting a second time division duplex (TDD) mode of operation on a second frequency channel substantially adjacent to the first frequency channel and supporting a plurality of uplink second transmission resources divided into uplink timeslots and a plurality of downlink second transmission resources divided into downlink timeslots. The first and second modes of operation are dissimilar, and communication over a substantial geographic area is provided by each of the two dissimilar TDD modes of operation. The method further comprises the steps of assigning a plurality of idle periods in the first mode of operation; allocating a time period in the second mode of operation to support switching communication between downlink and uplink transmissions; and arranging the plurality of idle periods to encompass the used time period.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION

The following description focuses on embodiments of the invention applicable to a UMTS (Universal Mobile Telecommunication System) cellular communication system and in particular to a UMTS Terrestrial Radio Access Network (UTRAN) operating in a Time Division Duplex (TDD) mode within a $3^{rd}$ generation partnership project (3GPP) system.

In particular, the embodiments of the present invention are described with reference to coexistence of E-UTRA systems and GERAN/3G systems, such as high chip rate (HCR-TDD) and low chip rate (LCR-TDD) modes of operation, where the systems operate in the same geographical area, potentially co-located and operating on substantially adjacent frequency channels. In the context of the present invention, the term 'substantially adjacent' is meant to encompass any frequency channel that is spectrally near to the channel in issue, where the transmissions on that substantially adjacent channel affect the reception of signals on the channel in issue.

However, it will be appreciated that the invention is not limited to this particular cellular communication system, but may be applied to other TDD-based cellular communication systems.

Furthermore, in one embodiment, the concept described indicates that the two dissimilar modes of operation support communications over a substantial portion of the same coverage area. The expression 'substantial portion of the same coverage area', in the context of the present invention, is meant to encompass any geographic area where a particular location is supported by two or more dissimilar modes of TDD operation, where a transmission on one mode may affect a communication that is using the other mode(s) of operation.

Figure 5:
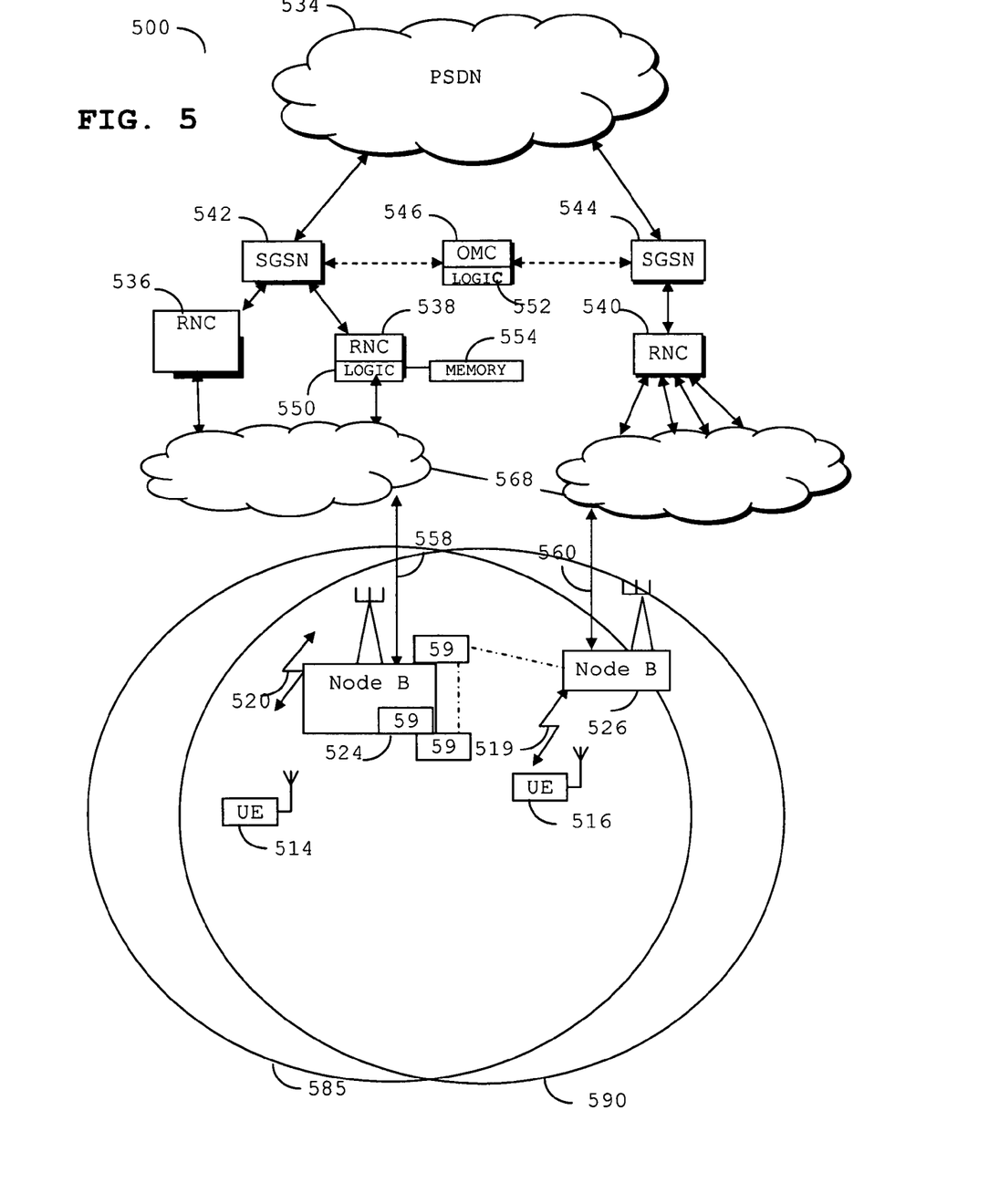
FIG. 5 illustrates a 3GPP cellular communication system adapted in accordance with some embodiments of the present invention.

Referring now to FIG. 5, a cellular-based communication system 500 is shown in outline, in accordance with one embodiment of the present invention. In this embodiment, the cellular-based communication system 500 is compliant with, and contains network elements capable of operating over, a universal mobile telecommunication system (UMTS) air-interface. In particular, the invention relates to the Third Generation Partnership Project (3GPP) specification for wideband code-division multiple access (WCDMA), time-division code-division multiple access (TD-CDMA) and time-division synchronous code-division multiple access (TD-SCDMA) standard relating to the UTRAN radio Interface (described in the 3GPP TS 25.xxx series of specifications).

In particular, the 3GPP system supports E-UTRA communication and LCR-TDD (and/or HCR-TDD) communication from a substantially co-located geographic position, such that a portion of their respective coverage areas overlap. Furthermore, the 3GPP cellular communication system supports both E-UTRA communication and LCR-TDD communication using the same allocation band of frequencies, such that the TDD communication from either an E-UTRA system or a LCR-TDD system may occupy adjacent frequency channels.

A plurality of subscriber terminals (or user equipment (UE) in UMTS nomenclature) 514, 516 communicate over radio links 519, 520 with a plurality of base transceiver stations, referred to under UMTS terminology as Node-Bs, 524, 526. The system comprises many other UEs and Node Bs, which for clarity purposes are not shown.

The wireless communication system, sometimes referred to as a Network Operator's Network Domain, is connected to an external network 534, for example the Internet. The Network Operator's Network Domain includes:

(i) A core network, namely at least one Gateway GPRS Support Node (GGSN) (not shown) and at least one Serving GPRS Support Nodes (SGSN) 542, 544; and
(ii) An access network, namely:
  (i) A GPRS (or UMTS) Radio network controller (RNC) 536, 540; and
  (ii) A GPRS (or UMTS) Node B 524, 526.

The GGSN/SGSN 544 is responsible for GPRS (or UMTS) interfacing with a Public Switched Data Network (PSDN) such as the Internet 534 or a Public Switched Telephone Network (PSTN) 534. A SGSN 544 performs a routing and tunnelling function for traffic within say, a GPRS core network, whilst a GGSN links to external packet networks, in this case ones accessing the GPRS mode of the system The Node-Bs 524, 526 are connected to external networks, through Radio Network Controller stations (RNC), including the RNCs 536, 540 and mobile switching centres (MSCs), such as SGSN 544 (the others are, for clarity purposes, not shown).

Each Node-B 524, 526 contains one or more transceiver units and communicates with the rest of the cell-based system infrastructure via an $I_{ub}$ interface, as defined in the UMTS specification.

In accordance with one embodiment of the present invention, a first serving communication unit (i.e., node-B 524) supports first time division duplex (TDD) mode of operation on a first frequency channel (i.e., E-UTRA communication) comprising a plurality of uplink first transmission resources divided into uplink timeslots and a plurality of downlink first transmission resources divided into downlink timeslots. Node-B 524 supports E-UTRA communication over geographic area 585.

In accordance with one embodiment of the present invention, a second serving communication unit (i.e., node-B 526) supports a second time division duplex (TDD) mode of operation on a second frequency channel substantially adjacent to the first frequency (e.g. LCR-TDD communication) comprising a plurality of uplink second transmission resources divided into uplink timeslots and a plurality of downlink second transmission resources divided into downlink timeslots. Node-B 526 supports LCR-TDD communication over geographic area 590.

Each RNC 536, 540 may control one or more Node-Bs 524, 526. Each SGSN 542, 544 provides a gateway to the external network 534. The Operations and Management Centre (OMC) 546 is operably connected to RNCs 536, 540 and Node-Bs 524, 526. The OMC 546 administers and manages sections of the cellular communication system 500, as is understood by those skilled in the art.

In accordance with one embodiment of the present invention, coexistence between E-UTRA and UTRA TDD modes is facilitated by synchronising E-UTRA communication to an adjacent UTRA TDD carrier. It is assumed that E-UTRA communication is operated in unpaired spectrum and half-duplex mode (i.e., in a "TDD mode") and uses the same numerology and timeslot duration as E-UTRA operating in paired spectrum. By synchronizing such communications between dissimilar systems, the uplink transmissions on one carrier do not interfere with downlink transmissions on another carrier, and vice versa.

In one embodiment of the present invention, a wireless serving communication unit, such as the Node-B, comprises a transmitter that is operably coupled to a processor 596 and a timing function (not shown). The wireless serving communication unit may further comprise a scheduler 592, or be operably coupled to a remote scheduler. Some embodiments of the invention utilize the processor 596 and/or the scheduler to insert idle periods in transmissions from the Node-B transmitter. The specific implementation within the processor of inserting such idle periods will be readily understood by a skilled artisan and not further described here.

The Node-B supports a first time division duplex (TDD) mode of operation on a first frequency channel, substantially adjacent a second time division duplex (TDD) mode of operation on a second frequency channel and comprises a plurality of uplink first transmission resources divided into uplink timeslots and a plurality of downlink first transmission resources divided into downlink timeslots.

The processor 596 arranges for transmissions of a plurality of idle periods in the first mode of operation arranged to encompass a time period used for switching communication between downlink and uplink transmissions of the second mode of operation.

The scheduler is configured to schedule complete timeslots or parts thereof as idle periods in the first and/or second modes of operation. In one embodiment, the scheduler may schedule neither uplink nor downlink transmissions in a particular timeslot or part thereof. Alternatively, or in addition, the scheduler may schedule special timeslots that comprise one or more idle periods contained therein. For example, the scheduler may schedule a timeslot that is half-data and half-idle period, instead of discarding a whole timeslot around a switching instant.

It is envisaged that the scheduler function may be operably coupled to, or located within, a first Node-B 524. It is envisaged that the scheduler 592 may be distal from the Node-B and/or its functionality may be distributed between a number of system elements. The scheduler is configured to adjust transmissions in one or both of the E-UTRA and/or LCR-TDD modes of operation.

It is also envisaged that the scheduler 592 is operably coupled to a monitoring function 594, which again may be coupled to, or located within, the Node-B or located elsewhere within the communication system. The operation of the monitoring function 594 is described later.

Figure 6:
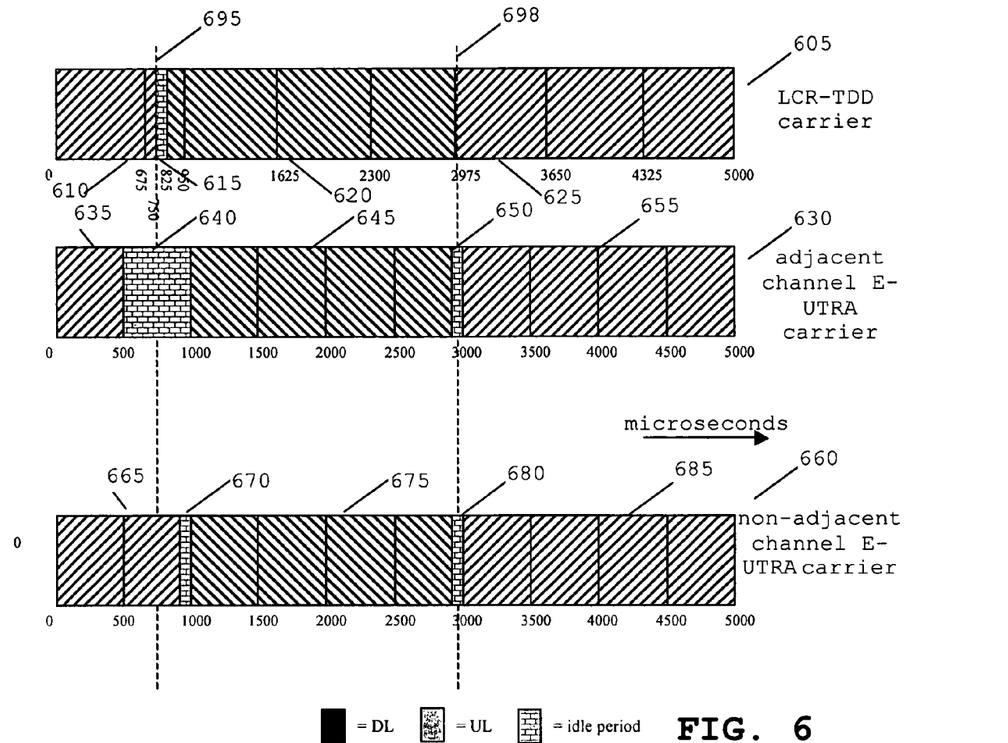
FIG. 6 illustrates a timing diagram highlighting alignment of E-UTRA and LCR-TDD transmissions through use of idle periods in accordance with some embodiments of the invention.

In accordance with one embodiment of the present invention, and referring now to FIG. 6, the two systems (E-UTRA and LCR-TDD) are synchronized via a judicious use of idle periods in, say, an E-UTRA frame structure 630, thereby facilitating coexistence between E-UTRA and LCR-TDD.

FIG. 6 illustrates a LCR-TDD carrier 605 (having a timeslot duration of 0.675 msec) comprising a downlink transmission 610, followed by an idle period 615. The idle period 615 is followed by an uplink transmission 620 and thereafter by a further downlink transmission 625. Those skilled in the art will understand that other idle periods (termed guard periods) are contained at the end of each 0.675 msec LCR-TDD timeslot. Notably, these idle periods in the LCR-TDD timeslot are incorporated to allow timing advance and to allow for inter-symbol interference (ISI). In contrast, the idle periods in some embodiments of the present invention are of a different scale, are inserted only where needed and are inserted judiciously to avoid interference with a dissimilar system on an adjacent carrier.

In accordance with one embodiment of the present invention, a timing diagram 630 of an adjacent channel E-UTRA transmission (having timeslot duration of 0.5 msec) is illustrated. Here, a downlink transmission 635 is followed by a scheduled E-UTRA timeslot-length idle period 640. The scheduled E-UTRA timeslot idle period 640 is followed by an uplink transmission 645 and thereafter by a further idle period 650. The further idle period 650 may be, for example, one SC-FDMA short block (of duration 35☐ sec) or one orthogonal frequency division multiplex (OFDM) symbol (of duration 71☐ sec).

Notably, in accordance with one embodiment of the present invention, an idle period has been inserted in the E-UTRA carrier encompassing the switching point between downlink and uplink in the LCR-TDD system. This has been inserted such that there are no time periods within the frame during which uplink transmission on the LCR carrier occurs at the same time as downlink transmission on the adjacent E-UTRA. Similarly, there are no time periods within the frame during which downlink transmission on the LCR carrier occurs at the same time as uplink transmission on the adjacent E-UTRA. Thus, the switchover from DL transmission to UL transmission (and vice versa) of the LCR-TDD carrier does not cause interference into the idle period of E-UTRA and the idle period in E-UTRA does not generate interference into LCR-TDD.

Thus, it is envisaged that idle periods will be applied in an E-UTRA channel 630 around uplink (UL)/downlink (DL) switching points 698 and DL/UL switching points 695.

In FIG. 6, the use of idle timeslots has only been shown for the case of a 3:3 UL:DL split. One split considered to be of particular interest when LCR-TDD is used for voice services, is when there is a substantially equal usage of UL and DL resources. Although FIG. 6 is illustrated with an even distribution between UL and DL resources, it is envisaged that the technique may also be applied to other UL:DL splits.

In accordance with one embodiment of the present invention, it is envisaged that the E-UTRA scheduler is also able to schedule complete timeslots as idle periods, simply by scheduling neither uplink nor downlink transmissions in a particular timeslot. Thus, these idle periods may be used to facilitate coexistence between E-UTRA and LCR-TDD modes of operation. Alternatively, the E-UTRA scheduler may designate one or more portions of the timeslot to contain idle periods (shorter than one complete timeslot) located at the start, middle or end of the timeslot. In this way, improved utilization of the frame may be realized (e.g. less time is reserved for idle periods) and hence transmission efficiency is improved.

FIG. 6 shows that an E-UTRA carrier that is adjacent to an LCR-TDD carrier can facilitate coexistence by not scheduling a 0.5 msec E-UTRA timeslot during the time period when the LCR-TDD carrier is switching between downlink and uplink (i.e., during the DownPTS/UpPTS portion of the LCR-TDD sub-frame). In this case, there is clearly no interference between the E-UTRA carrier and the LCR-TDD carrier, since there is no transmission on the E-UTRA carrier around the LCR-TDD switching point. Similarly, there is no interference between the LCR-TDD carrier and the adjacent E-UTRA carrier during the idle timeslot, as there is nothing for the LCR-TDD carrier to interfere with (that is the transmitters and receivers of the E-UTRA UEs and Node-Bs are not active during the E-UTRA idle period).

In FIG. 6, the UL/DL switching point is also configured to occur during an idle period within the E-UTRA frame structure. In this manner, there are no specific frame-related issues that affect coexistence between LCR-TDD and E-UTRA.

The capacity loss in the above frame structure, due to the use of the idle timeslot, is 10% (i.e., two idle timeslots out of twenty timeslots, one idle timeslot per LCR-TDD sub-frame). Advantageously, this capacity loss only applies for the first adjacent channel.

Finally, for completeness, FIG. 6 also illustrates a frame structure for a non-adjacent channel E-UTRA carrier 660. The E-UTRA carrier is sufficiently separated spectrally from the LCR-TDD carrier, such that all of the E-UTRA sub-frames can be used for data transmission. Here, a downlink transmission 665 is followed by a scheduled E-UTRA timeslot idle period 670. Notably, there is no specific requirement for this E-UTRA carrier to take measures to avoid interference with the non-adjacent LCR-TDD carrier. Hence, this non-adjacent E-UTRA carrier does not contain scheduled idle periods for the purpose of coexistence with a dissimilar technology. The idle periods 670 and 680 are required only to allow the UE and Node B to switch between transmit and receive modes. In this non-adjacent carrier, the timeslot that is coincident with the idle period 640 in the adjacent carrier is used for data transmission.

In the context of some embodiments of the present invention, any reference to a 'dissimilar system' is meant to encompass, but not be limited to, one or more of the following distinguishing features:

(i) a different timeslot duration between the systems/modes of operation;

(ii) additional signals in one of the systems, for example UpPTS/DwPTS, possibly with a time-duration that is not equal to a whole timeslot, within the time structure of the systems;

(iii) different frame or sub-frame durations between the systems;

(iv) different frame structures, for example different ordering of signals, between the systems; and (v) any other timing-related system parameter that is able to differentiate one mode of operation from the other.

Figure 7:
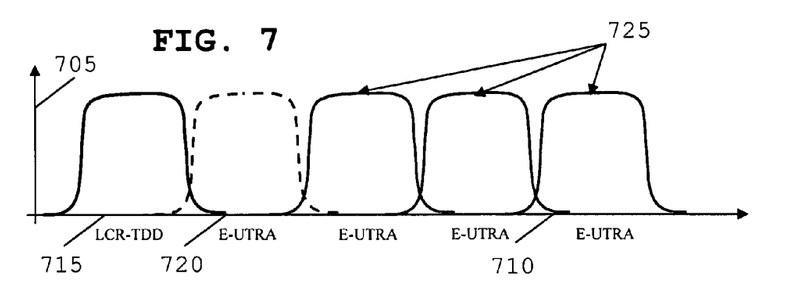
FIG. 7 illustrates a limited effect of the use of idle periods on the capacity of adjacent and non-adjacent E-UTRA carriers in accordance with some embodiments of the invention.

For non-adjacent channels, there is no capacity loss from the use of idle timeslots, or special timeslots containing substantial idle periods: for example, a timeslot comprising of half data and half idle period. Advantageously, only the E-UTRA carrier next to a LCR-TDD carrier needs to be operated with the additional idle periods (i.e., in the "synchronized compatibility mode" described above). The effect of the use of idle timeslots on capacity in adjacent and non-adjacent E-UTRA carriers is illustrated in FIG. 7. Here, the power spectral density 705 is plotted against frequency 710 for a number of adjacent channels, such as an LCR-TDD channel 715, an adjacent E-UTRA channel 720 and a number of non-adjacent E-UTRA channels 725. Thus, referring back to FIG. 6, with 10% capacity loss in the substantially adjacent channel, and no loss in the further (non adjacent) spectrally distant channels, a significant reduction in potential interference can be achieved when applying the inventive concept described herein.

A yet further advantage provided by the inventive concept herein described is that the approach allows a gradual evolution of spectrum from LCR-TDD carriers to full E-UTRA carriers over time. In the initial stages of E-UTRA deployment, a single E-UTRA carrier may be deployed (using the idle periods). As time progresses, more E-UTRA carriers may be deployed, where only one of these carriers needs to use idle periods to support coexistence. Once the whole spectrum has been transferred to E-UTRA, the full flexibility of E-UTRA may be adopted. Use of idle periods thus allows for a graceful transition of spectrum from LCR-TDD use to E-UTRA use.

In addition to use with a LCR-TDD channel, it is envisaged that the inventive concept may be similarly used for high chip rate (HCR) TDD systems when co-existing with E-UTRA systems. Use of an idle period, to allow for coexistence between E-UTRA in unpaired spectrum and HCR-TDD in an adjacent carrier, is not specifically required when the UL:DL split for the HCR-TDD carrier is of the form $3n:3\times(5-n)$ where n is an integer. This assumes a single switching point in the HCR-TDD frame structure. It should be noted that the UL:DL timeslot split is variable in HCR-TDD. Hence, an HCR-TDD network may be migrated to a $3n:3\times(5-n)$ UL:DL split in preparation for E-UTRA. It is envisaged that such a timeslot split would be appropriate for downlink-centric asymmetric traffic.

When the UL:DL split for the HCR-TDD carrier is not of the form $3n:3\times(5-n)$, various other frame/timeslot configurations on an HCR-TDD carrier adjacent in frequency to an E-UTRA carrier may still be accommodated by the use of idle periods inserted into the framing structure of the E-UTRA carrier, in a similar manner to that already described for coexistence of frequency-adjacent LCR-TDD and E-UTRA carriers. The idle periods are strategically inserted into the E-UTRA carrier to encompass switching points in the respective adjacent HCR-TDD systems.

In an enhanced embodiment of the present invention, a "frame offset" technique can be applied to the E-UTRA carrier adjacent to either LCR-TDD or HCR-TDD. However, it is envisaged that the LCR-TDD case is of greater interest to a frame-offset technique, since alignment between HCR-TDD and E-UTRA in unpaired can be easily achieved with the aforementioned $3n:3\times(5-n)$ UL:DL split.

Figure 8:
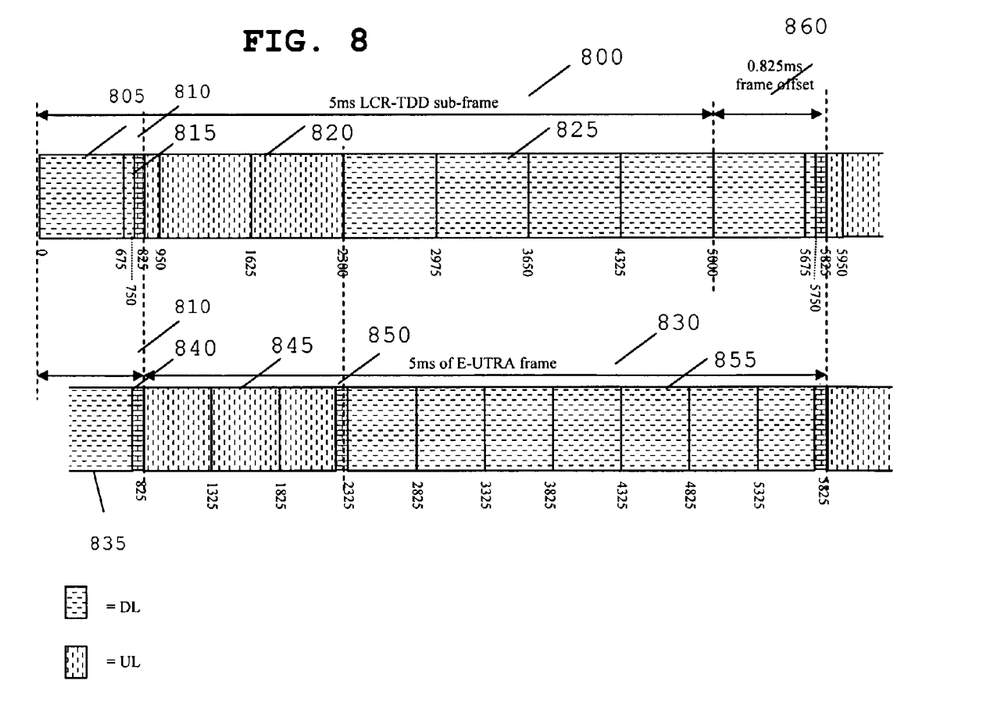
FIG. 8 illustrates a timing diagram of a frame offset approach in accordance with some embodiments of the invention.

Use of a frame offset technique to facilitate coexistence between LCR-TDD and E-UTRA is shown in FIG. 8. FIG. 8 illustrates a 5 msec LCR-TDD sub-frame comprising a DL transmission 805 followed by an idle period 815 and an UL transmission 820. The UL transmission 820 is followed by a DL transmission 825. The E-UTRA frame is offset (delayed) from the LCR-TDD frame by 0.825 msec. The E-UTRA frame comprises two 5 msec portions (in order to align with the 5 msec LCR-TDD sub-frames) comprising an idle period 840 and an UL transmission 845 and a further idle period 850. The further idle period 850 is followed by a DL transmission 855.

Advantageously, for a 2:4 UL:DL split, a frame offset of 0.825 msec between the LCR-TDD carrier and the E-UTRA carrier allows for alignment of the LCR-TDD uplink with the E-UTRA uplink (and similarly for the downlink). Note that the frame offset is a delay between the frame boundary of the LCR-TDD system and the frame boundary of the E-UTRA carrier. The use of a frame offset in this manner, enables the LCR-TDD and E-UTRA carriers to be synchronized, but with a time delay between the two carriers.

Thus, some embodiments of the present invention support two methods of aligning E-UTRA operating in unpaired spectrum with LCR-TDD and HCR-TDD. In the methods shown, the numerology and timeslot duration of E-UTRA in unpaired spectrum is the same as for paired spectrum operation.

Advantageously, the methods of aligning E-UTRA with UTRA TDD transmissions (such as LCR-TDD and HCR-TDD) may be used to facilitate coexistence of E-UTRA with existing UTRA TDD deployments in adjacent carriers.

Figure 9:
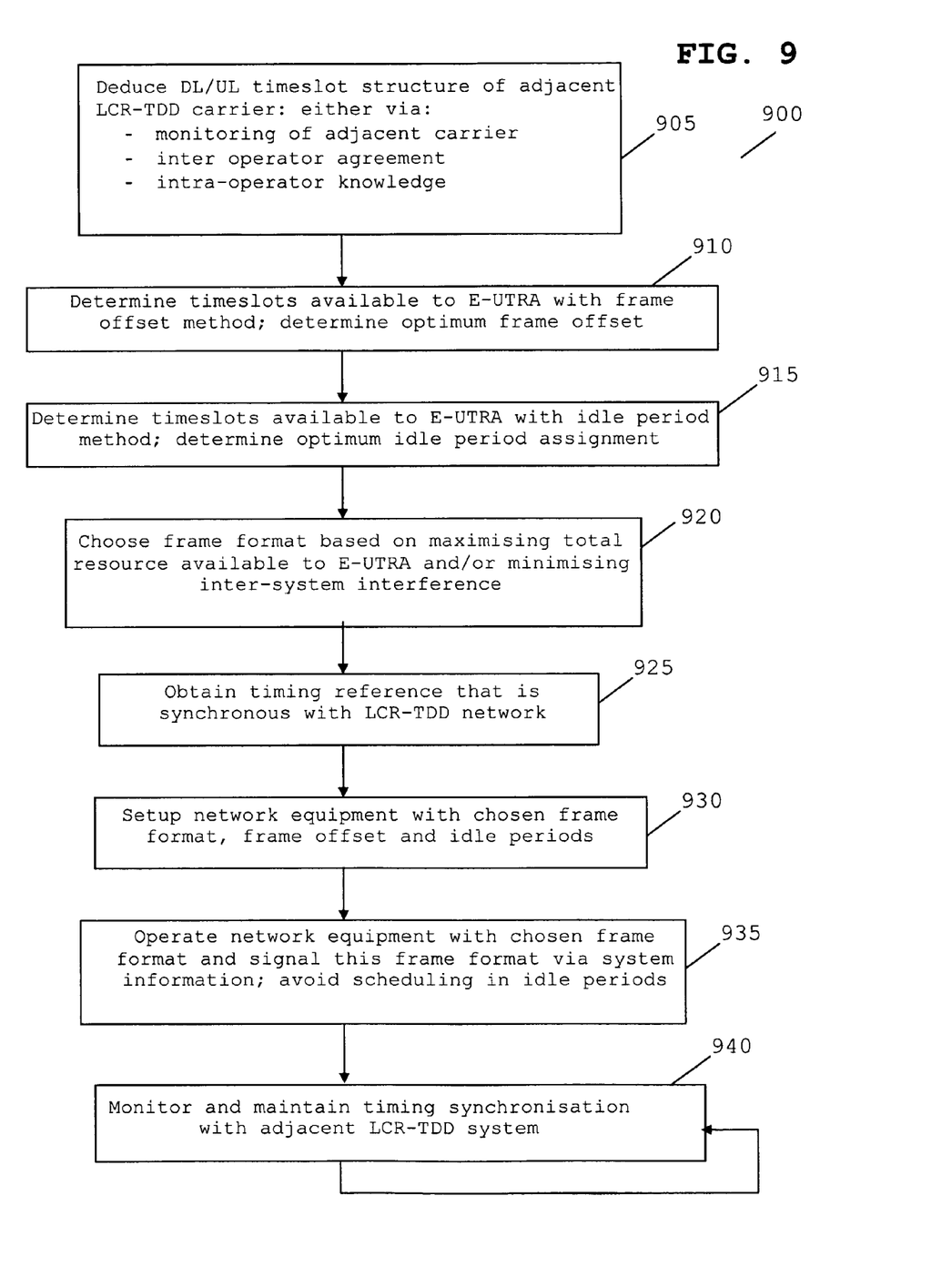
FIG. 9 illustrates a method of assigning the frame structure for the E-UTRA carrier that is adjacent to an LCR-TDD carrier in accordance with some embodiments of the invention.

Referring now to FIG. 9, a flowchart 900 illustrates a method of assigning a frame structure for an E-UTRA carrier that is substantially adjacent to an LCR-TDD carrier, in accordance with some embodiments of the invention.

The timeslot structure of an LCR-TDD system operating on the substantially adjacent carrier can be deduced in several ways, as illustrated in step 905. If the LCR-TDD carrier and the E-UTRA carrier belong to the same operator, then the timeslot structure of the substantially adjacent carrier is known. If the LCR-TDD carrier and E-UTRA carrier belong to different operators, the timeslot structure of the LCR-TDD system might be found by inter-operator agreement. In this context, it is in the interests of both the LCR-TDD operator and the E-UTRA operator to minimise potential interference between their respective systems. Furthermore, it is envisaged that it is possible for the E-UTRA operator to monitor the transmissions of the LCR-TDD operator.

With regard to a deduction method that involves monitoring of the substantially adjacent LCR-TDD carrier, the step of monitoring may include one or more of the following features:

(i) The E-UTRA operator may monitor substantially adjacent carriers and read the system information of these substantially adjacent carriers. It is envisaged that the Node B equipment used to support such a monitoring function may be more sensitive than that used in UEs, since the Node Bs are fixed devices in which more power-hungry, more costly and higher tolerance components can be used; and (ii) The E-UTRA operator may deduce the DL to UL timeslot transition of the LCR-TDD by monitoring the substantially adjacent LCR-TDD carrier and accessing a synchronisation signal sent on that substantially adjacent carrier. For LCR-TDD, such a synchronisation signal is sent on a downlink pilot time slot—DwPTS—and the uplink commences at a fixed time relative to the DwPTS.

The UL to DL timeslot transition may be deduced by performing signal processing functions on the signal from the substantially adjacent LCR-TDD carrier. These signal processing functions may include deducing spreading factors used on channels. It is known a-priori that downlink physical channels never use spreading factors of '2', '4' or '8'. Hence if use of one of these spreading factors is detected on a timeslot, then the Node-B may deduce that the timeslot is an uplink timeslot.

Alternatively, the Node B may monitor the timing of transmissions on the substantially adjacent carrier. The DL transmissions are synchronous whereas the UL transmissions from different UEs are not synchronous at the monitoring E-UTRA Node B, (except at the Node B that controls those transmissions via timing advance algorithms. Hence detection of non-synchronous transmissions can allow the Node-B to deduce that a timeslot is an uplink timeslot.

Referring back to FIG. 9, an example method of assigning and maintaining the frame structure for the E-UTRA carrier that is substantially adjacent to an LCR-TDD carrier is illustrated. It is assumed in FIG. 9 that the E-UTRA network has knowledge of the timeslot structure of the LCR-TDD system operating on the substantially adjacent carrier. Such a deduction can be made following any of the approaches in step 905.

It is also assumed that the timing reference of the LCR-TDD system may be deduced, in steps 910 and/or 915 to allow for synchronisation of the E-UTRA system with the LCR-TDD system. There are various methods of obtaining this timing reference. For example:

(i) When the LCR-TDD system uses the physical Node B synchronisation channel (PNBSCH), the E-UTRA system is able to monitor the PNBSCH of the LCR-TDD system to obtain a timing reference of the LCR-TDD system;

(ii) When the LCR-TDD system and E-UTRA system are both operated by the same operator, a common clock reference signal can be sent to both the LCR-TDD Node B and the E-UTRA Node B.

(iii) When the LCR-TDD system is synchronised via GPS, the E-UTRA system is also able to synchronise using GPS. In this case, there is a single fixed common external timing reference;

(iv) The E-UTRA system may also track the timing of the synchronisation signal on the downlink pilot time slot (DwPTS), or other downlink reference signal of the adjacent LCR-TDD carrier.

Thus, once the timeslots that are available to E-UTRA are determined, with respect to the aforementioned frame offset method and/or the idle period method, optimum values of frame offset and/or an idle period assignment are identified. A frame format is then selected, based on maximising a total resource available to E-UTRA and/or minimising inter-system interference, in step 920.

Thereafter, a timing reference that is synchronous with the LCR (or HCR) TDD network is obtained, as shown in step 925. The network equipment is then set up with the selected frame format, frame offset and/or associated idle periods, as in step 930. The network equipment is then operated with the selected frame format and this frame format is then signalled via the system information to other users, as shown in step 935. Thereafter, timing synchronisation can be monitored and maintained with the adjacent LCR-TDD system, as in step 940.

In the context of the aforementioned description, and in accordance with some embodiments of the invention, the term timeslots, in the context of E-UTRA, encompasses what 3GPP refer to as E-UTRA sub-frames. This expression for 'sub-frames' is, however, different to its use in LCR-TDD, where a sub-frame is specified as a 5 msec period of time consisting of several timeslots.

Although the aforementioned inventive concept has been described in terms of a single cellular communication system, such as a 3GPP system, encompassing two modes of operation, such as E-UTRA and LCR-TDD, it is envisaged that the inventive concept applies equally to two distinct cellular systems operating two respective modes of operation. Hence, any reference to single cellular communication system encompassing two modes of operation should be construed as incorporating two distinct systems.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The invention can be implemented in any suitable form including hardware, software, firmware or any combination of these. The invention may optionally be implemented, at least partly, as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, some embodiments of the invention may be implemented in a single unit or may be physically and/or functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories as appropriate. Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

We claim:

1. A cellular communication system comprising:
a first serving communication unit supporting a first time division duplex (TDD) mode of operation on a first frequency channel comprising a plurality of uplink first transmission resources divided into uplink timeslots and a plurality of downlink first transmission resources divided into downlink timeslots; and
a second serving communication unit supporting a second time division duplex (TDD) mode of operation on a second frequency channel substantially adjacent in frequency to the first frequency channel and supporting a plurality of uplink second transmission resources divided into uplink timeslots and a plurality of downlink second transmission resources divided into downlink timeslots;
wherein the first and second TDD modes of operation are dissimilar and communications on their respective channels cover overlapping geographic areas,
wherein the first serving communication unit is operable to transmit a plurality of idle periods in the first TDD mode of operation arranged to encompass time periods used by the second serving communication unit for switching communication between downlink and uplink transmissions within the second TDD mode of operation,
wherein at least a portion of at least one uplink timeslot of the first transmission resources corresponds in time with at least a portion of at least one uplink timeslot of the second transmission resources, and
wherein at least a portion of at least one downlink timeslot of the first transmission resources corresponds in time with at least a portion of at least one downlink timeslot of the second transmission resources.

2. The communication system of claim 1, wherein the plurality of idle periods of the first TDD mode of operation may comprise one or more of the following:
   (i) an idle timeslot;
   (ii) a part of a timeslot;
   (iii) an OFDM symbol;
   (iv) OFDM pilot;
   (v) an FDMA block;
   (vi) FDMA pilot; and
   (vii) duration of a CDMA data payload.

3. The communication system of claim 1, wherein the first serving communication unit is operable to introduce idle periods into the first TDD mode of operation to encompass switching periods of the second TDD mode of operation.

4. The communication system of claim 1, wherein only adjacent channel frequency transmissions between the two dissimilar TDD modes of operation are configured to comprise idle periods that encompass time periods used for switching.

5. The communication system of claim 1, wherein the first serving communication unit is operable to transmit at a frame offset relative to the second TDD mode of operation to adjust a timing of the idle period to encompass a switching period of the second TDD mode of operation.

6. The communication system of claim 1, further comprising a scheduler configured to schedule the idle periods in at least one of the first and second modes of operation by scheduling uplink and downlink transmissions at particular times such that they do not occur within a particular timeslot or by scheduling timeslots that comprise at least one idle period.

7. The communication system of claim 1, wherein the communication system is a $3^{rd}$ Generation Partnership Project (3GPP) cellular communication system.

8. The communication system of claim 7, wherein the first or second serving communication unit supports E-UTRA communications.

9. The communication system of claim 7, wherein the first or second serving communication unit supports GERAN/3G communication.

10. The communication system of claim 9, wherein the GERAN/3G communication comprises high chip rate (HCR-TDD) or low chip rate (LCR-TDD) transmissions.

11. The communication system of claim 1, wherein the dissimilar modes of operation comprise E-UTRA and LCR-TDD.

12. A wireless serving communication unit adapted to operate in the communication system as claimed in claim 1.

13. A wireless serving communication unit comprising:
a processor;
a timing function logic; and
a transmitter operably coupled to the processor and the timing function logic,
wherein the transmitter supports a first time division duplex (TDD) mode of operation on a first frequency channel substantially adjacent to a second frequency channel operating in a second time division duplex (TDD) mode of operation,
wherein the first frequency channel comprises a plurality of uplink first transmission resources divided into uplink timeslots and a plurality of downlink first transmission resources divided into downlink timeslots,
wherein the second frequency channel comprises a plurality of uplink second transmission resources divided into uplink timeslots and a plurality of downlink second transmission resources divided into downlink timeslots,
wherein the first and second TDD modes of operation are dissimilar and communications on their respective channels cover overlapping geographic areas,
wherein the processor schedules transmissions of a plurality of idle periods in the first TDD mode of operation arranged to encompass time periods used for switching communication between downlink and uplink transmissions of the second TDD mode of operation,
wherein at least a portion of at least one uplink timeslot of the first transmission resources corresponds in time with at least a portion of at least one uplink timeslot of the second transmission resources, and
wherein at least a portion of at least one downlink timeslot of the first transmission resources corresponds in time with at least a portion of at least one downlink timeslot of the second transmission resources.

14. The wireless serving communication unit of claim 13, wherein only adjacent channel frequency transmissions between the two dissimilar TDD modes of operation are configured by the processor to comprise idle periods that encompass time periods used for switching.

15. The wireless serving communication unit of claim 13, wherein the wireless serving communication unit is operable to transmit at a frame offset relative to the second TDD mode of operation to adjust a timing of the idle period to encompass the switching period of the second TDD mode of operation.

16. The wireless serving communication unit of claim 13, wherein the plurality of idle periods of the first mode of operation may comprise one or more of the following:
(i) an idle timeslot;
(ii) a part of a timeslot;
(iii) an OFDM symbol or OFDM pilot;
(iv) an FDMA block or FDMA pilot; and
(v) duration of a CDMA data payload.

17. The wireless serving communication unit of claim 16, further comprising a scheduler operably coupled to the processor and configured to schedule idle periods in the first TDD mode of operation by blocking uplink and downlink transmissions in a particular timeslot or by scheduling timeslots that comprise one or more idle periods.

18. The wireless serving communication unit of claim 13, further comprising a monitoring function operably coupled to the processor and arranged to monitor carrier frequency or timeslot transmissions of the second mode of operation.

19. A Node-B in a 3GPP communication system comprising the wireless serving communication unit of claim 13.

20. The wireless serving communication unit of claim 13, wherein the wireless serving communication unit supports at least one of E-UTRA, high chip rate (HCR-TDD) or low chip rate (LCR-TDD) transmissions in a 3GPP communication system.

21. A method of assigning wireless transmissions in a cellular communication system comprising: supporting a first time division duplex (TDD) mode of operation on a first frequency channel comprising a plurality of uplink first transmission resources divided into uplink timeslots and a plurality of downlink first transmission resources divided into downlink timeslots; supporting a second time division duplex (TDD) mode of operation on a second frequency channel substantially adjacent the first frequency channel and supporting a plurality of uplink second transmission resources divided into uplink timeslots and a plurality of downlink second transmission resources divided into downlink timeslots; assigning by a processor, a plurality of idle periods in the first TDD mode of operation; allocating by a processor switching time periods in the second TDD mode of operation to support switching communication between downlink and uplink transmissions; and arranging by a processor, the plurality of idle periods to encompass the allocated switching time periods; wherein the first and second TDD modes of operation are dissimilar and communications on their respective mod channels cover overlapping geographic areas wherein at least a portion of at least one uplink timeslot of the first transmission resources corresponds in time with at least a portion of at least one uplink timeslot of the second transmission resources, and wherein at least a portion of at least one downlink timeslot of the first transmission resources corresponds in time with at least a portion of at least one downlink timeslot of the second transmission resources.

22. The method of assigning wireless transmissions of claim 21, further comprising:
monitoring transmissions of at least one of the first and second TDD modes of operation;
wherein the assigning or the allocating uses a result of the monitoring.

23. The method of assigning wireless transmissions of claim 21, further comprising:
monitoring the substantially adjacent frequency channel; and
reading system information of the monitored substantially adjacent frequency channel.

24. The method of assigning wireless transmissions of claim 21, further comprising accessing a synchronization or reference signal transmitted on the substantially adjacent frequency channel.

25. The method of assigning wireless transmissions of claim 21, further comprising monitoring a timing of downlink transmissions on the substantially adjacent frequency channel.

26. A method for wireless communication in the presence of a dissimilar system comprising: supporting a first time division duplex (TDD..,) mode of operation on a first frequency channel substantially adjacent to a second frequency channel operating in a second time division duplex (TDD) mode of operation, wherein the first frequency channel comprises a plurality of uplink first transmission resources divided into uplink timeslots and a plurality of downlink first transmission resources divided into downlink timeslots wherein the second frequency channel comprises a plurality of uplink second transmission resources divided into uplink timeslots and a plurality of downlink second transmission resources divided into downlink timeslots, and wherein the first and second TDD modes of operation are dissimilar and communications on their respective channels cover overlapping geographic areas; and scheduling by a processor, transmissions of a plurality of idle periods in the first TDD mode of operation arranged to encompass time periods used for switching communication between downlink and uplink transmissions of the second TDD mode of operation, wherein at least a portion of at least one uplink timeslot of the first transmission resources corresponds in time with at least a portion of at least one uplink timeslot of the second transmission resources, and wherein at least a portion of at least one downlink timeslot of the first transmission resources corresponds in time with at least a portion of at least one downlink timeslot of the second transmission resources.

27. The method of claim 26, wherein only adjacent channel frequency transmissions between the two dissimilar TDD modes of operation are configured to comprise idle periods that encompass time periods used for switching.

28. The method of claim 26, further comprising transmitting at a frame offset relative to the second TDD mode of operation to adjust a timing of the idle period to encompass the switching period of the second TDD mode of operation.

29. The method of claim 26, further comprising scheduling by a processor, idle periods in the first TDD mode of operation by blocking uplink and downlink transmissions in a particular timeslot or by scheduling timeslots that comprise one or more idle periods.

30. The method of claim 26 further comprising monitoring carrier frequency or timeslot transmissions of the second mode of operation.

31. The method of claim 26, wherein the first TDD mode of operation comprises at least one of E-UTRA, high chip rate (HCR-TDD), or low chin rate (LCR-TDD) transmissions in a 3GPP communication system.

32. A computer-readable storage medium encoded with executable instructions, the executable instructions comprising instructions for:

supporting a first time division duplex (TDD) mode of operation on a first frequency channel substantially adjacent to a second frequency channel operating in a second time division duplex (TDD) mode of operation, wherein the first frequency channel comprises a plurality of uplink first transmission resources divided into uplink timeslots and a plurality of downlink first transmission resources divided into downlink timeslots, wherein the second frequency channel comprises a plurality of uplink second transmission resources divided into uplink timeslots and a plurality of downlink second transmission resources divided into downlink timeslots, and wherein the first and second TDD modes of operation are dissimilar and communications on their respective channels cover overlapping geographic areas; and scheduling transmissions of a plurality of idle periods in the first TDD mode of operation arranged to encompass time periods used for switching communication between downlink and uplink transmissions of the second TDD mode of operation, wherein at least a portion of at least one uplink timeslot of the first transmission resources corresponds in time with at least a portion of at least one uplink timeslot of the second transmission resources, and wherein at least a portion of at least one downlink timeslot of the first transmission resources corresponds in time with at least a portion of at least one downlink timeslot of the second transmission resources.

* * * * *

UNITED STATES PATENT AND TRADEMARK OFFICE
CERTIFICATE OF CORRECTION

PATENT NO. : 7,639,635 B2  Page 1 of 1
APPLICATION NO. : 11/303781
DATED : December 29, 2009
INVENTOR(S) : Nicholas William Anderson and Martin Warwick Beale It is certified that error appears in the above-identified patent and that said Letters Patent is hereby corrected as shown below:

ON THE TITLE PAGE

After Item (65) Prior Publication Data, insert the following:

Item -- (30) Foreign Application Priority Data
October 10, 2005 (GB) ................... 0520553.9 --

Column 18, Claim 21, Line 24; after "transmissions;" delete "and";

Column 18, Claim 21, Line 28; before "channels" delete "mod";

Column 18, Claim 21, Line 28; change "areas" to -- areas, --;

Column 18, Claim 26, Line 58; change "(TDD..,)" to -- (TDD) --;

Column 18, Claim 26, Line 64; change "timeslots" to -- timeslots, --;

Column 19, Claim 30, Line 29; change "claim 26" to -- claim 26, --; and

Column 19, Claim 31, Line 34; change "chin" to -- chip --.

Signed and Sealed this

Thirtieth Day of March, 2010

David J. Kappos
*Director of the United States Patent and Trademark Office*